United States Patent [19]

Nakano et al.

[11] Patent Number: 5,024,284

[45] Date of Patent: Jun. 18, 1991

[54] APPARATUS FOR RUNNING A CAR AT CONSTANT SPEED

[75] Inventors: Shigeru Nakano, Daitou; Yasuhiro Kondou, Hirakata, both of Japan

[73] Assignee: Matsushita Electric Industrial Co. Ltd., Kadoma, Japan

[21] Appl. No.: 384,206

[22] Filed: May 31, 1989

Related U.S. Application Data

[63] Continuation of PCT JP88/00756, Jul. 28, 1988, abandoned.

[30] Foreign Application Priority Data

Jul. 31, 1987 [JP] Japan .................. 62-192921

[51] Int. Cl.$^5$ ............................. B60K 31/04
[52] U.S. Cl. ..................... 180/179; 180/170; 364/426.04
[58] Field of Search .......... 180/179, 178, 170; 364/426.04

[56] References Cited

U.S. PATENT DOCUMENTS

| 4,389,990 | 6/1983 | Murray | 180/179 |
|---|---|---|---|
| 4,394,739 | 7/1983 | Suzuki et al. | 180/179 |
| 4,434,469 | 2/1984 | Suzuki et al. | 364/426.04 |
| 4,467,428 | 8/1984 | Caldwell | 180/179 |
| 4,522,280 | 6/1985 | Blaney | 180/179 |
| 4,835,696 | 5/1989 | Suzuki et al. | 180/179 |

FOREIGN PATENT DOCUMENTS

| 2829894 | 1/1980 | Fed. Rep. of Germany | 180/179 |
|---|---|---|---|
| 56-28218 | 6/1981 | Japan . | |
| 57-56640 | 4/1982 | Japan . | |
| 60-64039 | 4/1985 | Japan | 180/170 |

Primary Examiner—Andres Kashnikow
Assistant Examiner—Eric Culbreth
Attorney, Agent, or Firm—Cushman, Darby & Cushman

[57] ABSTRACT

The present invention relates to an apparatus for running a car at constant speed, the apparatus controlling the car to run at a desired speed, wherein by a control circuit (21), both a car-speed deviation and an acceleration are taken as variables, and a pulse-width of pulse signals having a predetermined period is computed from a function for defining pulse-width, and the above-mentioned pulse is given to an actuator (12) for adjusting opening of a throttle valve (13), thereby quickening to settle down to a set car-speed, to enable to stably run at constant speed. Moreover, resetting device (9), (220), second constant-speed-running canceling device (11), (219) which cancel a state of constant-speed-running only by operation of a canceling switch (8), (28), and checking device (10) for checking memory data are provided, thereby improving safety and reliability of control.

2 Claims, 6 Drawing Sheets

APPARATUS FOR RUNNING A CAR AT CONSTANT SPEED

RELATED APPLICATION

This is a continuation of our International application No. PCT/JP88/00756 which designated the United States when filed Jul. 28, 1988, now abandoned.

TECHNICAL FIELD

The present invention relates to an apparatus for running a car at constant speed, which controls the car to run at a selected speed or another speed set with a desired value by a setting operation to a desired speed during driving, without any operation onto an accelerator pedal.

BACKGROUND ART

Recently, the apparatus for running a car at constant speed, which automatically controls the car to run at the set speed, has been provided for the car.

In the conventional apparatus for running a car at constant speed, when a speed of the car reaches a desired speed during driving, this speed of the car is set by carrying out a setting operation by the driver; the running speed after setting is compared with the set speed of the car; a throttle valve is closed at the time when the running speed is larger than the set speed; and the throttle valve is opened at the time when the running speed is smaller than the set speed, thereby controlling the running speed near the set speed. Further, in the conventional apparatus for running a car at constant speed, when the driver operates a braking pedal and a clutch under a state such that the driver drives the car to run at a desired constant speed, a microcomputer in the apparatus for running a car at constant speed receives signals from a canceling switch which is actuated by the operation of the braking pedal and the clutch, and a running state of constant speed is canceled by a signal outputted from this microcomputer.

However, in the conventional apparatus for running a car at constant speed, owing to the surface of the road and the force of the wind, a deviation between the running speed and the set speed becomes large, or acceleration and deceleration are repeated around the set speed, and therefore response for making the actual running speed close to the set speed becomes slow, and there is such a problem as to give undesirable feelings to the driver.

Besides, in the conventional apparatus for running a car at constant speed, when the microcomputer is partially damaged by static electricity or electromagnetic noise etc., thereby resulting in a state such that the microcomputer does not operate to follow the program; the microcomputer does not accept the signal from the cancel switch, and the running state of constant speed can not be canceled. Furthermore, when the microcomputer runs away from the program in a manner to increase the speed of the car, it may become impossible to safely drive the car, and there exists such a problem as to fall into a very dangerous state.

DISCLOSURE OF THE INVENTION

A main object of the present invention is to offer the apparatus for running a car at constant speed, which has high response against the fluctuant speed of the car and is capable of giving a sense of stability to the driver, by properly adjusting the opening of the throttle valve.

Further, another object of the present invention is to offer the apparatus for safely running a car at constant speed which can easily and surely cancel the state of constant-speed running by operations of the braking pedal and the clutch, even when the microcomputer runs away, by canceling the state of constant-speed running at the moment of operation of the canceling switch regardless of an output signal for canceling the state of constant-speed running in the microcomputer or resetting the microcomputer at the above-mentioned moment. Further, another object of the present invention is to offer the very safe apparatus of running a car at constant speed, which can avoid a dangerous state such that after returning to the control state of constant-speed the car begins to run in constant-speed toward the set speed which is set against the driver's will, by checking that there is no damaged portion of memory data of the microcomputer after releasing of a resetting state.

The above-mentioned objects of the present invention are achieved by the following construction.

Namely the present invention is, in the apparatus for running a car at constant speed, which compares a previously set speed with the actual running speed and controls the opening of the throttle valve so as to equalize both speeds, characterized by comprising car-speed measuring means for measuring an actual running speed of the car, car-speed setting means for setting a desired speed of the car, car-speed-deviation computing means for computing the deviation between the set speed and the actual running speed, acceleration computing means for computing the acceleration from a change in the actual running speed of the car, pulse-width computing means in which both the car-speed deviation computed by the aforementioned car-speed-deviation computing means and the acceleration computed by the aforementioned acceleration computing means are taken as variables and the pulse-width of pulse signals having a predetermined period is computed by inputting the aforementioned variables to a function defining the pulse-width, and pulse output means which issues pulse signals having the pulse-width computed by the aforementioned pulse-width computing means and the predetermined period.

Moreover, in the above-mentioned construction, the present invention also includes an embodiment in which pulse signals issued from the pulse output means are issued to an actuator, which drives the throttle valve, via constant-speed-running canceling means. Also, the present invention is, in the apparatus for running a car at constant speed, which compares a previously set speed with the actual running speed and controls the opening of the throttle valve so as to equalize both speeds, characterized by comprising car-speed measuring means for measuring the actual running speed of the car, car-speed setting the means for setting desired speed of the car, car-speed-deviation computing means for computing the deviation between the set speed and the actual running speed, acceleration computing means for computing the acceleration from a change in the actual running speed of the car, pulse-width computing means in which both the car-speed deviation computed by the aforementioned car-speed-deviation computing means and the acceleration computed by the aforementioned acceleration computing means are taken as variables and the pulse-width of pulse signals having a predetermined period is computed by inputting the aforementioned variables to a function defining the pulse-width, pulse output means which issues pulse signals having the pulse-width computed by the aforementioned pulse-width computing means and the predetermined period, first constant-speed-running canceling means which cancels the state of constant-speed running by receiving a signal of the canceling switch actuated by operation of the braking pedal or the clutch, a microcomputer including the above-mentioned respective means, second constant-speed-running canceling means which is provided besides the first constant-speed running canceling means in the microcomputer and disposed outside the microcomputer, and an actuator which adjusts opening of the throttle valve by the pulse signals of the above-mentioned pulse output means during a state such that constant-speed-running is not canceled.

Also the present invention is, in the apparatus for running a car at constant speed, which compares a previously set speed with the actual running speed and controls the opening of the throttle valve so as to equalize both speeds, characterized by comprising car-speed measuring means for measuring actual running speed of the car, car-speed setting means for setting desired speed of the car, car-speed-deviation computing means for computing the deviation between the set speed and the actual running speed, acceleration computing means for computing the acceleration from change of the actual running speed of the car, pulse-width computing means in which both the car-speed deviation computed by the aforementioned car-speed-deviation computing means and the acceleration computed by the aforementioned acceleration computed means are taken as variables and the pulse-width of pulse signals having a predetermined period is computed by inputting the aforementioned variables to a function defining the pulse-width, an actuator which adjusts opening of the throttle valve by the pulse signals having the pulse-width computed by this pulse-width computing means and a predetermined period, resetting means which is actuated by operations of the braking pedal or the clutch and resets the aforementioned microcomputer at the moment when the canceling switch for canceling the state of constant-speed-running turns ON, and means for checking that memory data of the aforementioned microcomputer are not damaged after releasing of resetting state.

BEST MODE FOR CARRYING OUT THE INVENTION

Figure 1:
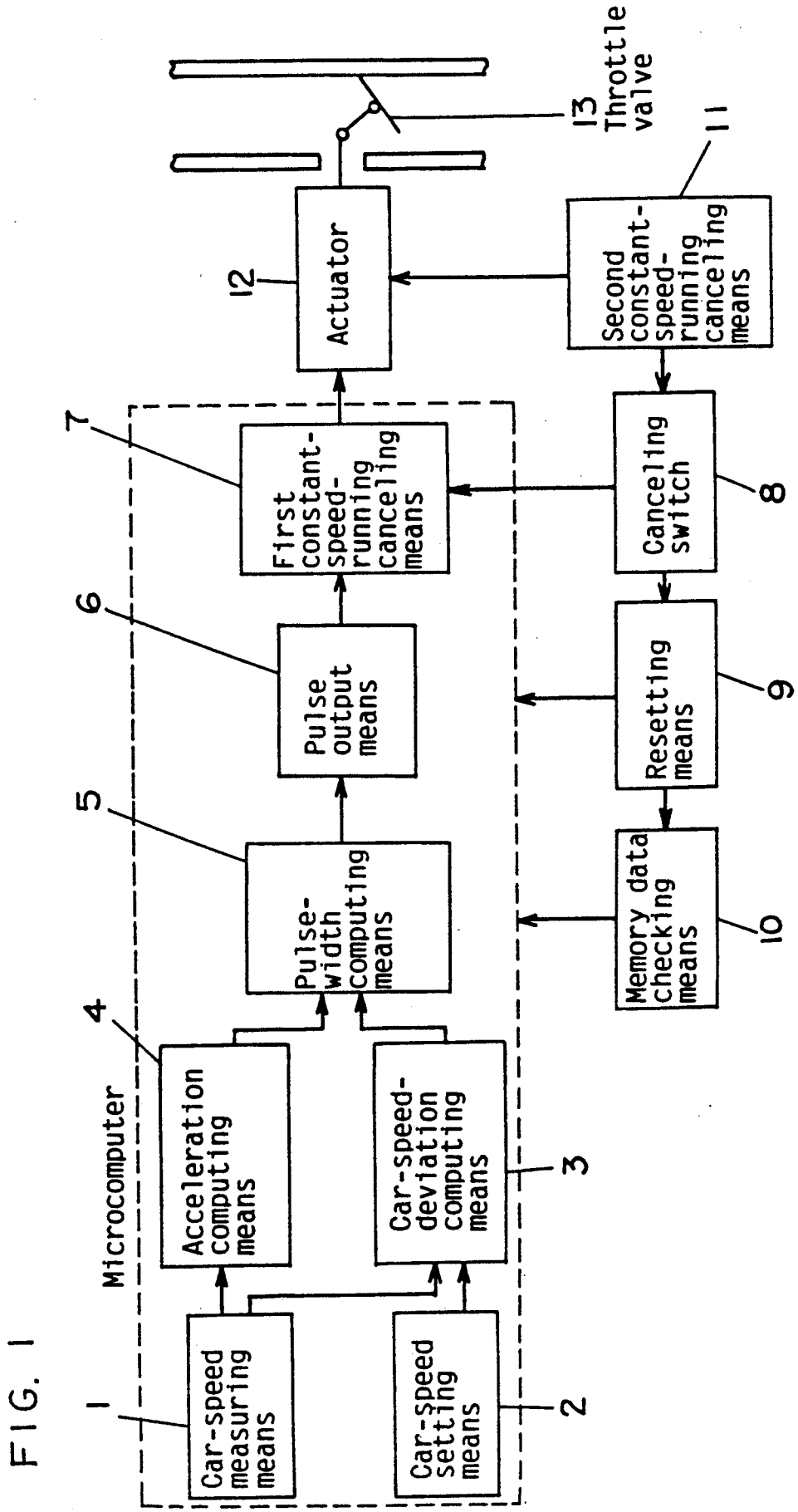
FIG. 1 is a whole structural view showing a constant-speed running apparatus in an embodiment of the present invention.

FIG. 1 is a whole structural view showing an apparatus for running at constant speed in an embodiment of the present invention.

FIG. 1, numeral 1 designates a car-speed measuring the means for measuring actual running speed of the car; numeral 2 car-speed setting means for setting disired car-speed; numeral 3 car-speed-deviation computing means for computing deviations between the actual running speed of the car and the set speed of the car; numeral 4 acceleration computing means for computing the acceleration from a change in the actual running speed of the car; numeral 5 pulse-width computing means in which both the car-speed deviation computed by the car-speed-deviation computing means 3 and the acceleration computed by the acceleration computing means 4 are taken as variables and a pulse-width of pulse signals having a predetermined period is computed by inputting the variables to a function defining the pulse-width; numeral 6 pulse output means which issues pulse signals having the pulse-width computed by the pulse-width computing means 5 and the predetermined period; numeral 7 first constant-speed-running canceling means which receives a signal from a canceling switch actuated by operation of the braking pedal or the clutch to thereby cancel the running state of constant-speed; numeral 11 second constant-speed-running canceling means which is provided besides the first constant-speed-running canceling means 7 and disposed outside the microcomputer; numeral 12 an actuator which adjusts the opening of the throttle valve 13 by the pulse signals issued from the pulse output means 6 during that the state of constant-speed is not canceled; numeral 9 resetting means which resets the above-mentioned microcomputer at the moment when the canceling switch 8 turns ON; numeral 10 memory-data checking means for checking that memory data of the above-mentioned microcomputer are not damaged after releasing of the resetting state.

Figure 2:
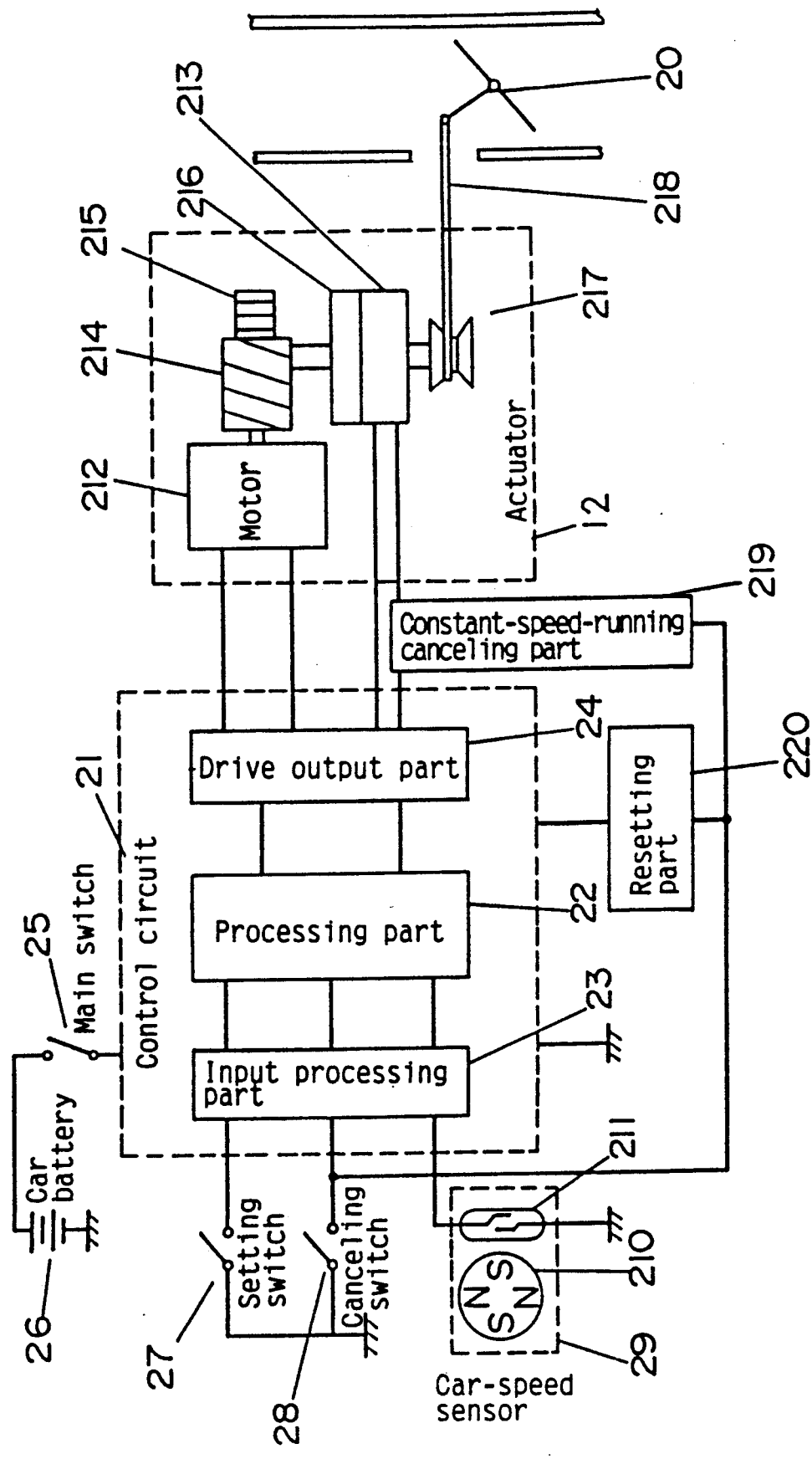
FIG. 2 is a drawing showing one concrete embodiment of FIG. 1.

FIG. 2 shows one concrete embodiment of FIG. 1, and numeral 21 designates a control circuit which comprises: an input processing part 23 for processing input signals of the microcomputer; a processing part 22 for processing along the signals from the input processing part 23; and a drive output part 24 which drives the actuator 12 including a motor 212 and an electromagnetic clutch 213 by the signals from the processing part 22.

This control circuit 21 issues four kinds of drive outputs, which are, to open the throttle valve 13, to close the throttle valve 13, to hold the opened/closed state of the throttle valve 13 and to quickly close the throttle valve 13. The actuator 12 ajusts opening of the throttle valve 13 in response to the output of the control circuit 21. The actuator 12 comprises: the motor 212; the electromagnetic clutch 213; a worm gear 214 linked with an output shaft of the motor; a worm wheel 215 engaging with a gear box 216; the gear box 216 comprising a clutch disk, which is engaged with or disengaged from the electromagnetic clutch 213, and a reduction mechanism which reduces rotation of the worm wheel 215 and transmits the rotation to a bobbin 217 via the clutch disk; and the bobbin 217 which rolls a cable 218 for driving the throttle valve 13.

To open the throttle valve 13, the control circuit 21 electrifies the electromagnetic clutch 213; the clutch disk in the gear box 216 is made to engage with the electromagnetic clutch 213; and rotation of the worm wheel 215 is transmitted to the bobbin 217, to drive the motor 212 in a direction for opening the throttle valve 13. To close the throttle valve 13, the control circuit 21 electrifies the electromagnetic clutch 213; the clutch disk in the gear box 216 is made to engage with the electromagnetic clutch 213; and rotation of the worm wheel 215 is transmitted to the bobbin 217, to drive the motor 212 in a direction for closing the throttle valve 13. Also, to hold the throttle valve 13, the controls circuit 21 electrifies only the electromagnetic clutch 213 to engage the clutch disk in the gear box 216 with the electromagnetic clutch 213 and makes the motor 212 into a state of stoppage. Also, to quickly close the throttle valve 13, the control circuit 21 and a constant-speed-running canceling part 219 stop electrifying to the electromagnetic clutch 213, and the clutch disk in the gear box 216 is disengaged from the electromagnetic clutch 213, and the bobbin 217 is also released from the reduction mechanism in the gear box 216, and thereby the throttle valve 13 is quickly closed by a return spring 20 of an accelerator pedal.

Numeral 27 designates a setting switch, which can set the car-speed by turning OFF from ON at the time of reaching to the desired car-speed as a set car-speed, thereby starting the constant-speed-running by the apparatus for running a car at constant speed. Numeral 28 designates the cancel switch, which is actuated by the operation of the braking pedal or the clutch and issues the signals to the control circuit 21 and the constant-speed-running canceling part 219 and stops electrifying to the electromagnetic clutch 213 and cancel the state of constant-speed-running in accordance with the apparatus for running a car at constant speed.

Numeral 29 designates a car-speed sensor, and it has four magnetic poles and comprises a rotor 210, which rotates to synchronize a shaft of the car, and a reed switch 211 and issues four pulses during one rotation of the rotor 210.

Numeral 26 designates a car-battery, and numeral 25 a main switch of the apparatus for running at constant speed and also a power switch of the control circuit 21.

Numeral 220 designates a resetting part, and it receives the signal of the canceling switch and gives a resetting signal to the control circuit 21 at the moment of canceling.

Numeral 219 designates a constant-speed-running canceling part, and it cancels the state of constant-speed-running of the apparatus for running a car at constant speed by ceasing to electrify the electromagnetic clutch 213 at the reception of the canceling signal as well as the drive output part 24.

Figure 3:
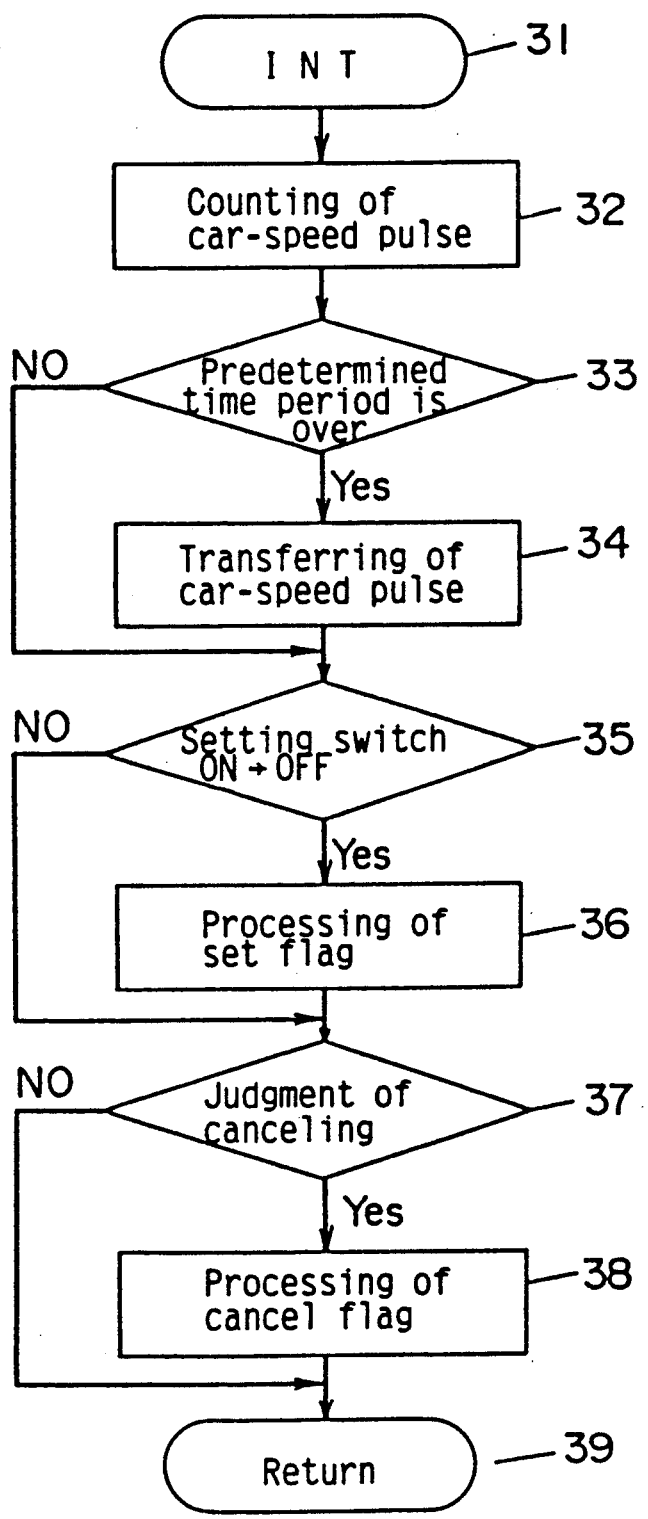
FIG. 3 is a flow-chart showing a timer-interrupting routine of a control circuit.
Figure 4:
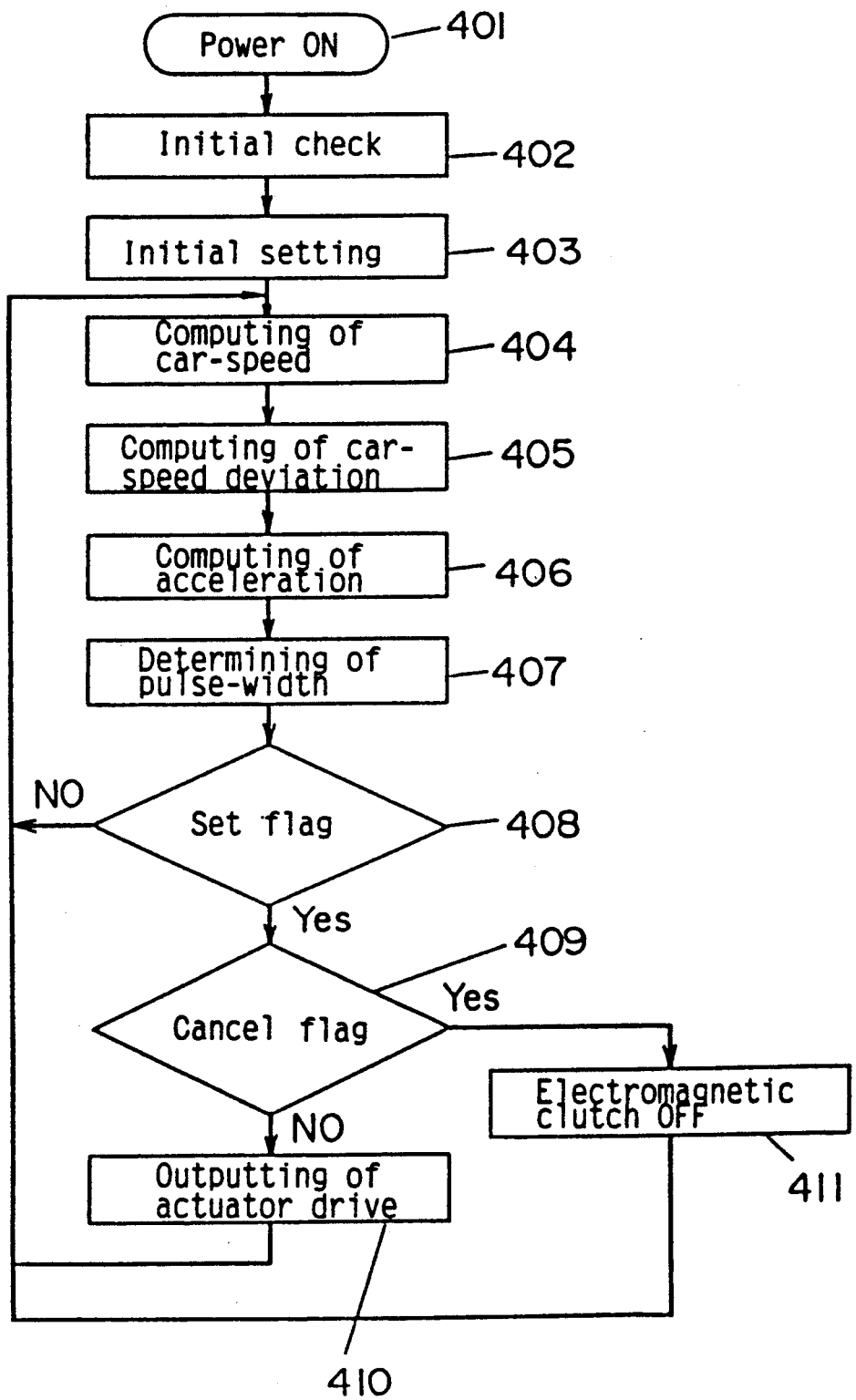
FIG. 4 is a flow-chart showing an operation of main routine of the control circuit.

FIG. 3 and FIG. 4 are flow-charts showing operations of the control circuit 21, and FIG. 3 shows a timer-interrupting routine and FIG. 4 shows a main routine.

FIG. 3 is the flow-chart showing the timer-interrupting routine in which the step 31 is started by the timer-interruption of the microcomputer.

When the step 31 is started, firstly, change of car-speed pulses is observed at the step 32, and the car-speed pulses are counted at the time when change of the car-speed pulses is observed. And, it is counted in the step 33 whether a predetermined time period lapses, and when the predetermined time period has lapsed, the number of the car-speed pulses counted during the predetermined time period is transferred to the memory at the step 34.

If the predetermined time period does not lapse, advance to the step 35 is made. Next, it is checked at the step 35 whether the setting switch turns OFF from ON, and if turning is made, a set flag is set at the step 36 and a car-speed at that time is set as a set car-speed, thereby permitting control of the constant-speed-running. If there is not turning, advance to the step 37 is made. Further, a state of the canceling switch is checked at the step 37, and if the state is judged as cancel, a cancel flag is set at the step 38, and driving of the actuator is canceled and the throttle valve is quickly closed. If it is not required to cancel, advance to the step 39 is made, and return to the main routine shown in FIG. 4 is made.

FIG. 4 is the flow-chart showing the main routine. When the main switch shown in FIG. 2 turns ON, the processing part 22 is started up, to execute the program from the step 401. First of all, an initial check is executed at the step 402, to ensure that there is no fault in the memory data. Next, initial setting is executed at the step 403.

At this point, initial setting of the memory data in the processing part 22, input-output command for the port and initial setting of the output port etc. are carried out.

Hereat, the aforementioned timer-interruption is prohibited until this step is completed. Next, at the step 404, the car-speed is computed from the car-speed pulses counted in the timer-interruption during the predetermined time period, and thereafter at the step 405, the deviation from the set car-speed set at the step 36 (as shown in FIG. 3) of the timer-interruption is computed, and at the step 406, the difference between the car-speed computed in the previous step 404 and the car-speed computed in the present step 404 is computed as the acceleration.

Figure 5:
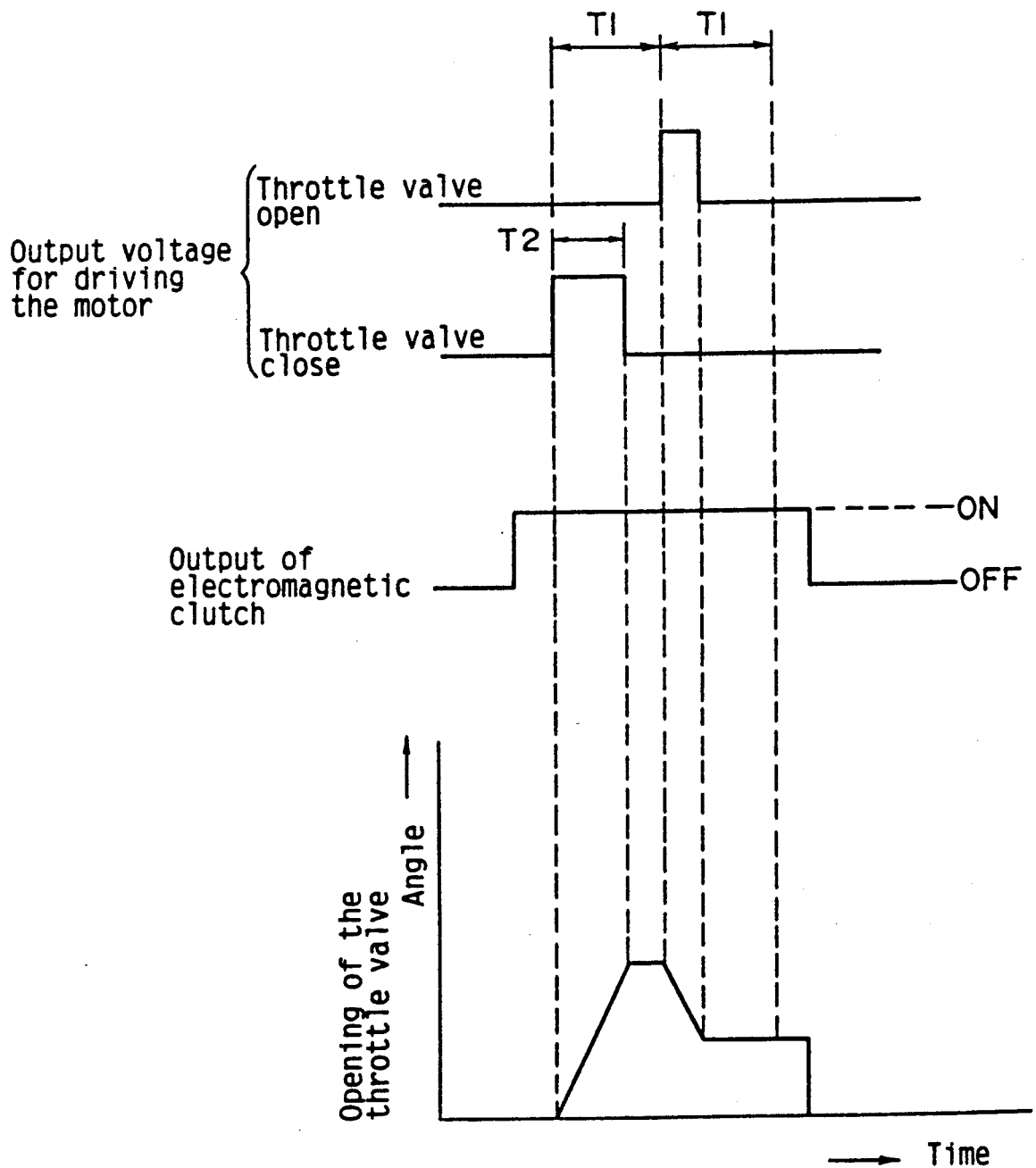
FIG. 5 is a graph showing relations between driving outputs of the actuator and the throttle valve.

Next, at the step 407, a pulse-width $T_2$ of the drive output voltage (as shown in FIG. 5) of the motor 212 is determined. $T_1$ is defined as a period of pulse of the output voltage, and by changing $T_2$ within the range of:

$$0 < T_2 \leq T_1,$$

the mean value of the drive output voltage of the motor 212 is changed, and thereby the rotation speed of the motor 212 is changed, thereby enabling a change in the opening/closing amount per time-unit of the throttle valve 13. This state is shown in FIG. 5.

The pulse-width $T_2$ is determined by the following equation:

$$T_2 = A\Delta V + B\Delta\alpha.$$

Figure 6:
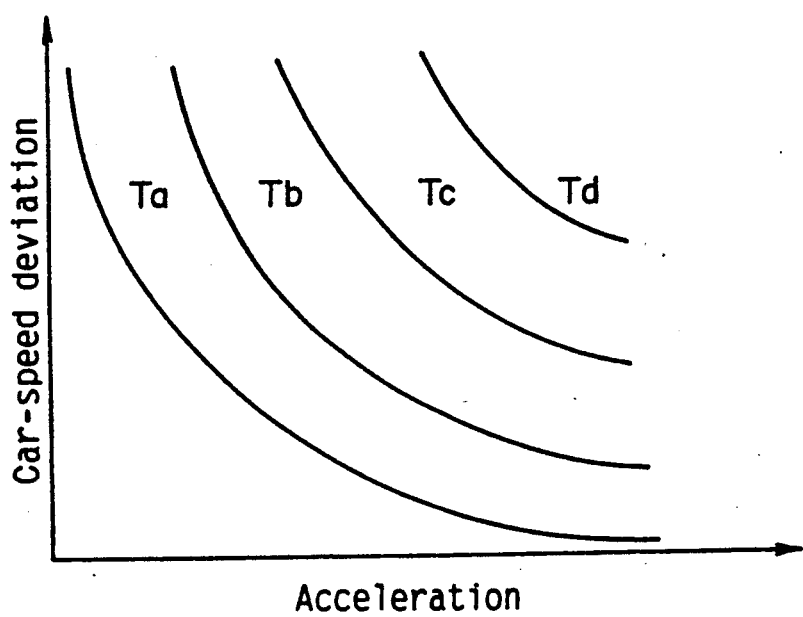
FIG. 6 is a graph showing an example of relation among the pulse width, the car-speed-deviation and the acceleration.

Herein, a letter $\Delta V$ is a deviation between the actual running car-speed and the set car-speed, and a letter A is a constant determined by the deviation between the actual running car-speed and the set car-speed, and a letter B is a constant determined by the difference between the car-speed computed at previous stage and the car-speed computed at the present stage. That is, the pulse-width $T_2$ is determined by a function having both the car-speed-deviation and the acceleration as variables. In FIG. 6, an example of relations among the pulse-width, the car-speed-deviation and the acceleration are shown.

Also, the constants A and B can be freely changed in the relations with the $\Delta V$ and $\Delta\alpha$ in accordance with each of the regions in which the actual running car-speed $\Delta V$ and $\Delta\alpha$ exist.

Next, a state of the setting flag is checked at the step 408, and if it is permitted to run at constant speed, advance to the step 409 is made, and if it is not permitted, return to the step 404 is carried out. A state of the canceling flag is checked at the step 409, and if it is not prohibited to run at constant speed, advance to the step 410 is made, and if it is prohibited, advance to the step 411 is made. At the step 410, output voltage for driving the actuator is issued. Firstly, the electromagnetic clutch 213 is turned ON, thereby making a state such that the bobbin 217 rotates by the output of the motor 212. During acceleration of the car, the throttle valve 13 moves in a direction to close (by applying voltage having polarity to rotate the motor 212), and during deceleration of the car, the throttle valve 13 moves in a direction to open (by applying voltage having polarity to rotate the motor 212), and the pulses having the pulse-width $T_2$ and the period $T_1$, which are determined at the step 407, are issued. When the actual car-speed is equal to the set speed and there exists no change of the car-speed, the electromagnetic clutch 213 is turned ON, but the motor 212 does not drive and the bobbin 217 is locked, thereby holding the opening of the throttle, and thereafter it returns to the step 404.

If constant-speed-running is prohibited at the step 409, the electromagnetic clutch 213 is turned OFF at the step 411; the bobbin 217 is released from the linked part of the motor 212; and the throttle valve is quickly closed by a return spring 20 of the accelerator pedal. After that, it returns to the step 404. Also, when the constant-speed-running canceling part 219 receives the canceling signal, the electromagnetic clutch 213 is turned OFF, and the throttle valve is quickly closed in the same way as aforementioned.

And, when the resetting part receives the canceling signal and the control circuit 21 is reset, the control circuit starts up again from the step 401 even when any step is executing after releasing from the resetting state. And, initial check of the memory data is executed at the step 402, and before resetting, namely before canceling, it is confirmed that the memory data is not damaged by the static electricity or the electromagnetic noise etc., and advance to the step 403 is executed. If the memory data is damaged, advance to the step 403 is not made; the control circuit 21 does not respond to any input signals; and the output signal keeps OFF-state.

At the step 403, initial setting of the memory data is executed again. Thereby, set car-speed, which has been set before resetting, if erased. And, each step is executed in the aforementioned way.

INDUSTRIAL APPLICABILITY

As mentioned above, the present invention can offer the apparatus for running at constant speed, which defines the function to determine the pulse-width by making the car-speed-deviation and the acceleration to be variables as means for computing the pulse-width and inputs the car-speed-deviation and the acceleration to this function to determine the pulse-width, thereby properly adjusting opening of the throttle valve in response to the car-speed-deviation and the acceleration, thereby having high response to the change of the car-speed and giving sense of stability to the driver.

Besides, even when the microcomputer runs away, by providing the second constant-speed-running canceling means which cancels the state of constant-speed-running at the moment of operation of the canceling switch regardless of the output signal for canceling the state of constant-speed-running in the microcomputer, the apparatus for running at constant speed, which easily and surely cancels the state of constant-speed-running by operations of the braking pedal and the clutch, can be offered.

Further, by virtue of the resetting means for resetting the microcomputer at the moment when the canceling switch turns ON and the memory data checking means for checking that there is no damage in the memory data of the microcomputer after releasing of resetting state, even when the microcomputer runs away, it is possible to offer the apparatus for running at constant speed with improved safety, and the apparatus can safely and surely cancel the state of constant-speed-running by operations of the braking pedal and the clutch and disables to run at constant speed in case that the memory data are damaged by the static electricity and the electromagnetic noise etc., and even in case that the memory data are not damaged it is possible to avoid the dangerous state such that after returning to the control state of constant-speed the car begins the constant-speed-running toward the set car-speed, which is against the driver's will, owing to that the set car-speed is changed.

We claim:

1. An apparatus for running a car at a constant speed, said apparatus comparing a desired speed with an actual running speed and controlling an opening of a throttle valve to equalize said actual running speed and said desired speed, said apparatus comprising:
   car-speed measuring means for measuring said actual running speed of the car;
   car-speed setting means for setting the desired speed of the car;
   car-speed-deviation computing means for computing a deviation between said desired speed and said actual running speed;
   acceleration computing means for computing an acceleration as a change in said actual running speed of the car;
   pulse-width computing means for calculating a pulse width as a function of both said car-speed deviation computed by said car-speed deviation computing means and said acceleration computed by said acceleration computing means;
   pulse output means for issuing a pulse signal having said pulse-width computed by said pulse-width computing means and having a predetermined period;
   a microcomputer including first constant-speed-running canceling means disposed within the microcomputer for canceling a state of constant-speed running by receiving a signal of a canceling switch;
   second constant-speed-running canceling means disposed outside said microcomputer for also canceling the state of constant-speed-running by receiving the signal of the canceling switch; and
   an actuator which adjusts the opening of the throttle valve during the predetermined period in accordance with the pulse width of the pulse signals of said pulse output means, only when the constant-speed-running is not canceled.

2. An apparatus for running a car at a constant speed, said apparatus comparing a desired speed with an actual running speed and controlling an opening of a throttle valve to equalize said actual running speed and said desired speed, said apparatus comprising:
   car-speed measuring means for measuring said actual running speed of the car;
   car-speed setting means for setting the desired speed of the car;
   car-speed deviation computing means for computing a deviation between said desired speed and said actual running speed;

acceleration computing means for computing an acceleration as a change in said actual running speed of the car;

pulse-width computing means for calculating a pulse width as a function of both said car-speed deviation computed by said car-speed deviation computing means and said acceleration computed by said acceleration computing means;

an actuator which adjusts the opening of the throttle valve during a predetermined period in accordance with the pulse width of said pulse signals;

a microcomputer having memory data and including resetting means, which is actuated by operation of a cancelling switch, for resetting said microcomputer at a moment when a canceling switch for canceling a state of constant-speed-running turns ON; and means for checking that memory data of said microcomputer are not damaged after said resetting means releases said resetting operation.

* * * * *